United States Patent [19]
Finger

[11] Patent Number: 5,812,964
[45] Date of Patent: Sep. 22, 1998

[54] MULTI-VALUED LOCALIZED STRINGS

[75] Inventor: Mark J. Finger, Lawrence, Kans.

[73] Assignee: Informix Software, Inc., Menlo Park, Calif.

[21] Appl. No.: 641,103

[22] Filed: Apr. 29, 1996

[51] Int. Cl.$^6$ ............................................. G06F 17/28
[52] U.S. Cl. ...................................... 704/7; 704/8
[58] Field of Search ...................... 395/453, 468, 395/471, 472, 601, 681; 704/2, 8, 7

[56] References Cited

U.S. PATENT DOCUMENTS

| | | | |
|---|---|---|---|
| 5,261,069 | 11/1993 | Wilkinson et al. | 395/471 |
| 5,434,994 | 7/1995 | Shaheen et al. | 395/471 |
| 5,546,573 | 8/1996 | Obermann et al. | 395/601 |
| 5,581,753 | 12/1996 | Terry et al. | 395/468 |
| 5,613,079 | 3/1997 | Debique et al. | 395/468 |
| 5,613,122 | 3/1997 | Burnard et al. | 395/681 |
| 5,664,206 | 9/1997 | Murow et al. | 704/8 |

OTHER PUBLICATIONS

Jaeschke, Internationalization: a primer (the first of a two–part series on software internationalization support in Standard C), p. 67–, Sep. 1995.
The Unicode Consortium, *The Unicode Standard, Worldwide Character Encoding*, Version 1.0, vol. 1, Addison–Wesley Publishing Company, Inc., 1991.
The Unicode Consortium, *The Unicode Standard, Worldwide Character Encoding*, Version 1.0, vol. 2, Addison–Wesley Publishing Company, 1992.
Kano, Nadine, *Developing International Software For Windows 95 and Windows NT*, Microsoft Press, 1995.
Informix, *GLS Library Programmer's Guide*, 1996.
Digital Equipment Corporation, working draft, *Database Language SQL/Foundation*, Maynard, Massachusetts, 1994.

*Primary Examiner*—Parshotam S. Lall
*Assistant Examiner*—Patrice L. Winder
*Attorney, Agent, or Firm*—Fish & Richardson P.C.

[57] ABSTRACT

A computer-implemented method for making a data item available to a user program and a source program. The method includes providing a user interface for the user program to gain access to the data item for reading or writing, providing a source interface for the source program to gain access to the data item for reading or writing, providing a user locale and a source locale, providing a user buffer and a source buffer to store the data item, maintaining status memory to store the status of the user buffer contents and the source buffer contents, setting the status of the source buffer to be non-current and the user buffer to be current when new data is stored in the user buffer through the user interface, setting the status of the user buffer to be non-current and the source buffer to be current when new data is stored in the source buffer through the source interface, satisfying a request from the user interface to read the data item by reading the contents of the user buffer if the status of the user buffer is current and converting the contents of the source buffer from the source locale to the user locale and storing the converted contents in the user buffer before the user buffer is read if the status of the user buffer is non-current, and satisfying a request from the source interface to read the data item by reading the contents of the source buffer if the status of the source buffer is current and converting the contents of the user buffer from the user locale to the source locale and storing the converted contents in the source buffer before the source buffer is read if the status of the source buffer is non-current.

25 Claims, 3 Drawing Sheets

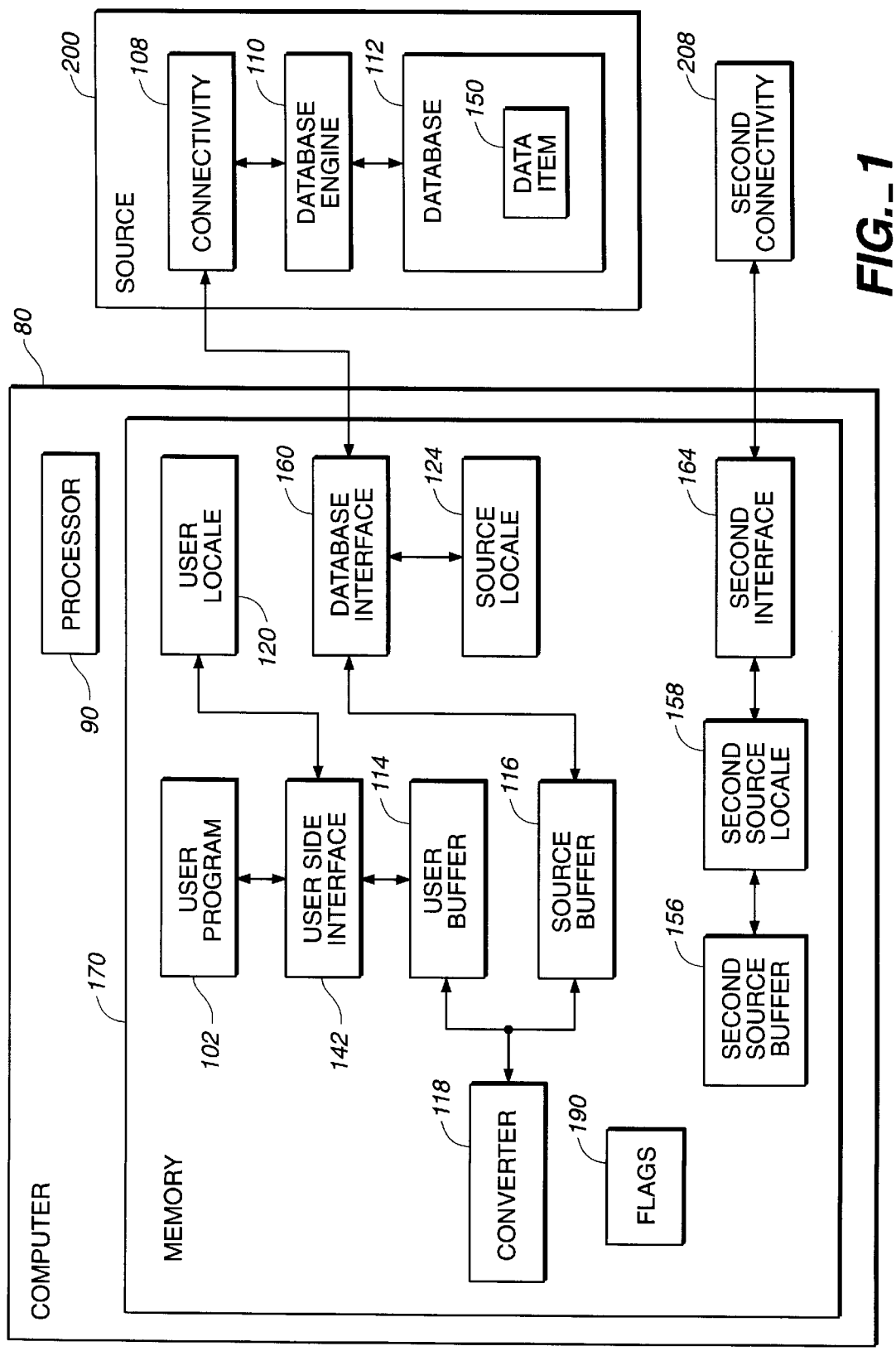
FIG._1

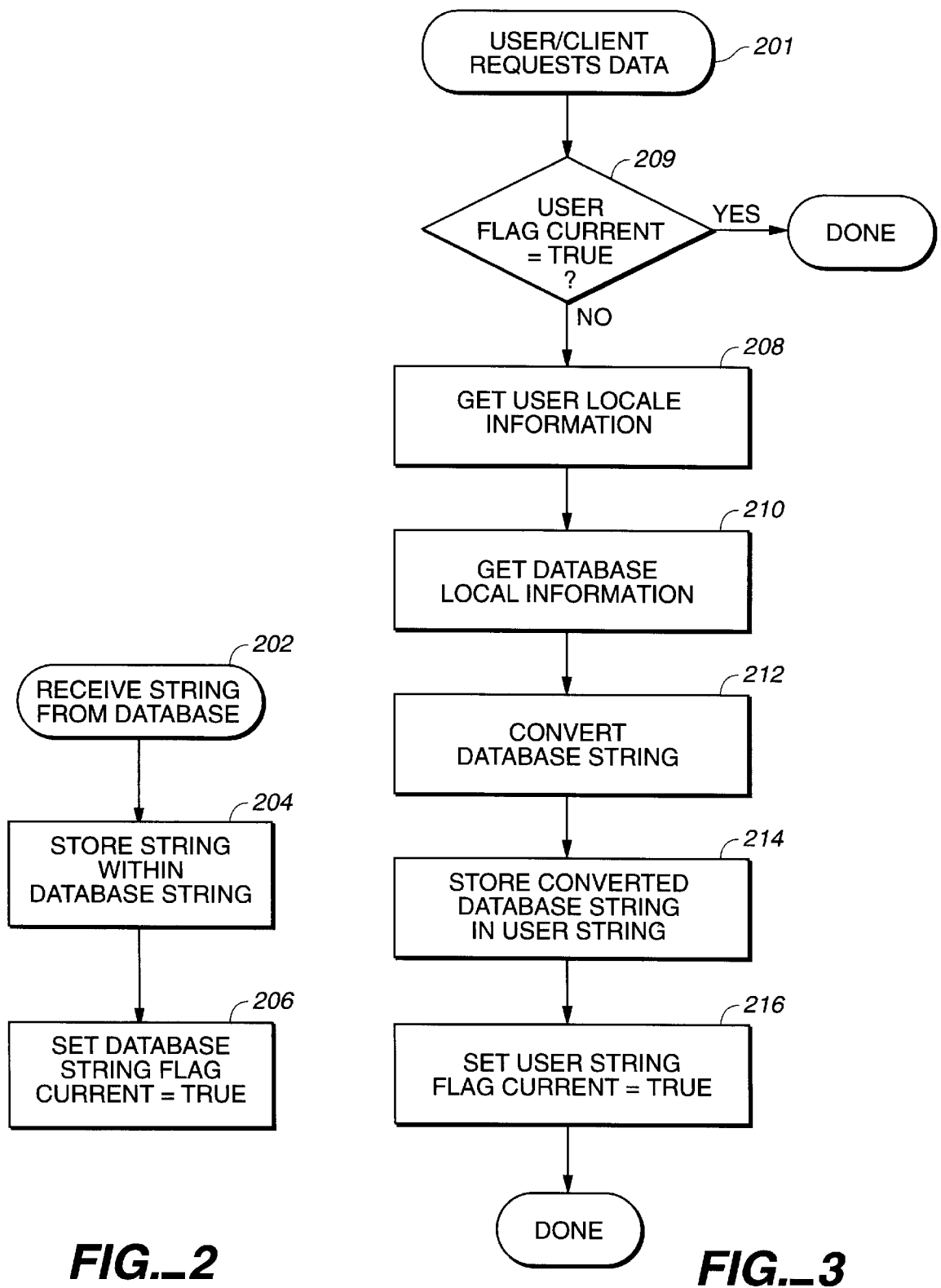

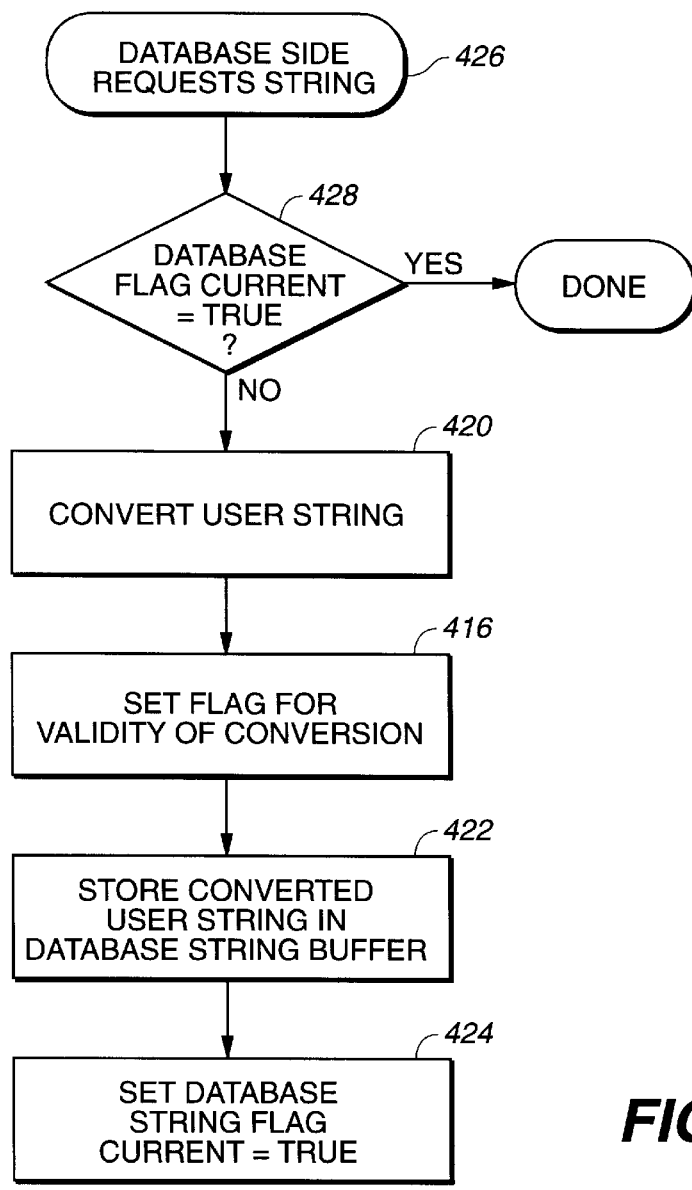
FIG._4
FIG._5

MULTI-VALUED LOCALIZED STRINGS

BACKGROUND

The present invention relates generally to the handling of data, such as text, day-date, and currency, that have different representations in different localities.

A computer program may use data provided by sources that differ from the using or user program and/or from each other in their country- or language-specific conventions for character, representation, sorting, date/time, currency, numbers, and so on. The using program and its sources of data may be on one computer or distributed over a number of computers. Common examples of such distribution include extended spreadsheet programs and databases implemented in a client-server architecture, where the client is the user or application program and the server or servers are the source and sometimes also the destination of data.

To put matters in terms of a client-server implementation, differences in the way data is represented between different servers and between a server and a client may lead to difficulties in using and integrating data from different sources. Such difficulties may occur with respect to the data itself as well as with respect to the names, for example, database field names, that may be used to gain access to the data.

Differences most often arise as differences in character sets. For example, a UNIX system in Taiwan supporting Chinese normally has a character set of about 59,000 characters. A Microsoft Windows system in Taiwan supporting Chinese normally has a character set with less than half that number of characters. If a field name from a database server on the UNIX system is to be represented in the Microsoft Windows system, for example, certain characters may be lost in the conversion. These unconvertible characters may appear in a Windows application as a rectangle or other default character. If the field name were to be converted back to the database server, the latter may not be able to resolve the default characters unambiguously and would thus no longer recognize the field name.

A similar problem may arise with collation (sort order) because character sets may differ in the rules by which they sort strings. For example, one character set may place accented characters after the corresponding unaccented characters (Ñ after N) while another may place accented characters after the entire unaccented alphabet (Ñ after Z).

SUMMARY OF THE INVENTION

In general, in one aspect, the invention features a programmed computer-readable medium having instructions for causing a computer to maintain in a memory a user buffer for storing data, user locale information describing a user locale, a source buffer for storing data, source locale information describing a source locale, and status flags to indicate the status of data stored in the user buffer and the source buffer; instructions to set the status flags to indicate that the source data is non-current and the user data is current when new data is stored in the user buffer; instructions to set the status flags to indicate that the user data is non-current and the source data is current when new data is stored in the source buffer; instructions to use the user locale information and the source locale information to convert data in the source buffer and store the converted data in the user buffer if the source data is current and the user data is non-current, and then to set the status flags to indicate that both the user data and the source data are current; instructions to use the user locale information and the source locale information to convert data in the user buffer and store the converted data in the source buffer if the user data is current and the source data is non-current, and then to set the status flags to indicate that both the source data and the user data is current; and instructions to maintain both the source buffer and the user buffer simultaneously as instances of a data item.

Implementations of the invention may include the following features. The instructions may also include instructions for causing the computer to maintain in a memory a second buffer for storing data, second locale information describing a second locale, and status flags to indicate the status of data stored in the second buffer. The instructions may also include instructions for causing the computer to provide a first set of computer program routines to form a user-side interface to data, to provide a second set of computer program routines to form a source-side interface to data, to respond to a request to read a data item by reading from the user buffer if the request is a user-side request from the user-side interface and reading from the source buffer if the request is a source-side request from the source-side interface, to cause the data in the source buffer to be converted and stored in the user buffer if the request is a user-side request and the user data is non-current, and to cause the data in the user buffer to be converted and stored in the source buffer if the request is a source-side request and the source data is non-current.

In general, in another aspect, the invention features a computer-implemented method for making a data item available to a user program and a source program. The method includes the steps of providing a user interface for the user program to gain access to the data item for reading or writing, providing a source interface for the source program to gain access to the data item for reading or writing, providing a user locale, providing a source locale, providing a user buffer to store the data item, providing a source buffer to store the data item, maintaining status memory to store the status of the user buffer contents and the source buffer contents, setting the status of the source buffer to be non-current and the user buffer to be current when new data is stored in the user buffer through the user interface, setting the status of the user buffer to be non-current and the source buffer to be current when new data is stored in the source buffer through the source interface, satisfying a request from the user interface to read the data item by reading the contents of the user buffer if the status of the user buffer is current and converting the contents of the source buffer from the source locale to the user locale and storing the converted contents in the user buffer before the user buffer is read if the status of the user buffer is non-current, and satisfying a request from the source interface to read the data item by reading the contents of the source buffer if the status of the source buffer is current and converting the contents of the user buffer from the user locale to the source locale and storing the converted contents in the source buffer before the source buffer is read if the status of the source buffer is non-current.

Implementations of the invention may include the following features. In the method the source program may be a server and the user program may be a client to the server. In the method the source program may be a database server managing a database and a database engine handling requests for access to the database. In the method the database may be a relational database managed by a relational database management system including the database engine. In the method the data item may be the name of a field of a record of the database. In the method the locale of the data item may be a locale defined for a field of a database in the data source. In the method the locale of the data item may be a locale defined for a database in the data source. In the method the locale of the data item is a locale defined for the data source. In the method the data source may be a collection of distributed objects and the data item may be in one of the distributed objects. In the method the data item may be in an OLE object.

Implementations of the invention may include the following steps: providing a second interface for a second program to gain access to the data item for reading or writing, providing a second locale, providing a second buffer to store the data item, maintaining status memory to store the status of the second buffer contents, setting the status of the second buffer to be non-current when new data is stored in the user buffer through the user interface or in the source buffer through the source interface, setting the status of the user buffer to be non-current and the source buffer to be non-current and the second buffer to be current when new data is stored in the second buffer through the second interface, and satisfying a request from the second interface to read the data item by reading the contents of the second buffer if the status of the source buffer is current and converting the contents of the either the user buffer from the user locale or the source buffer from the source locale to the second locale and storing the converted contents in the second buffer before the second buffer is read if the status of the second buffer is non-current.

Among the advantages of the invention are the following. The invention allows compatibility between and among programs and systems with different locales, such as those employing alternative character sets. The invention reduces character loss problems in update situations, for example. The invention allows flexible manipulation of data.

For a fuller understanding of the nature and further advantages of the invention, reference should be made to the detailed description taken in conjunction with the accompanying drawings.

BRIEF DESCRIPTION OF THE DRAWINGS

FIG. 1 is a block diagram of a system implementing the invention.

FIG. 2 is a flowchart of a method of the invention.

FIG. 3 is a flowchart of a method of the invention where a data item is converted.

FIG. 4 is a flowchart of a method of the invention where data is edited.

FIG. 5 is a flowchart of a method of the invention where data is converted.

DETAILED DESCRIPTION

Referring to FIG. 1, a user program 102 running on computer 80 communicates with a database 112 through intermediate components. In particular, user program 102 communicates with a client process implemented with a multi-valued string class that provides client-side interface services through user-side interface 142. Computer 80 communicates with the database 112 through the database engine 110 and the database interface 160.

When a record is requested from the database 112, the record is retrieved from the database by the database engine 110. Normally, a connectivity layer 108 is present, and the database engine 110 and the computer 80 communicate through the connectivity layer 108. For example, with the OnLine Workgroup Server v. 7.12 database engine, the Informix I/Connect runtime library, a database can communicate with an application program such as the Informix Relational Object Manager v. 1.0, all available from Informix Software, Inc. of Menlo Park, Calif.

Referring to FIG. 2, a record having a data item that is a string is read from the database (step 202). For the sake of simplicity in this discussion, the record will be assumed to have a single data item of type character string. The string data is initially stored in the database string buffer 116 (step 204) and the database flag CURRENT is set TRUE (step 206). The database string buffer 116 is one of two buffers that are part of the multi-valued localized string buffer. The other buffer is user string buffer 114. The database flag current and the user flag current are stored as FLAGS 190.

Referring to FIG. 3, when the user or client requests the data (step 201), it does so through the client or user side interface 142, which gets the data from the user string buffer 114, not from the database string buffer 116. The contents of the user string buffer 114 will be returned if the user flag CURRENT is TRUE (step 209).

If the database item is to be provided to the user 102, for example in editing operation, the string is converted (step 212), as will be described.

The converter 118 converts the database string from its form in the database to a form appropriate to the user 102. Normally, this is a simple character set conversion. The conversion is based on the locales of both the use and the data item. The term "locale" refers to a collection of information about country- or language-specific conventions for characters, sorting, date/time, currency, numbers, and so on. The data item's locale will generally be that of its original source, the database or the database server, but may be associated more specifically with a field of the database; for example, in a relational database the locale may be associated with a column. The database locale information is stored in database locale buffer 124, and the user locale information is stored in user locale buffer 120. The user locale information may also be implicit, for example in a converter module such as converter 118.

Converter 118 uses the locale information (steps 208 and 210) to perform the conversion in a conventional way (step 212) such as by the use of a conversion look-up table.

The string that results from the conversion is stored in the user buffer 114 and will be referred to as the "user string" (step 214). The database string, on which the conversion was performed, remains in the database string buffer 116 in its original form.

At this stage both the user string and the database string represent unedited data from the database: the user string has been converted but remains unedited. The user flag CURRENT is set to TRUE to agree with the corresponding database flag (step 216).

Referring to FIG. 4, when a different data item, in the present example a different string, is provided through the user-side interface to the user string buffer 114, the database flag CURRENT is set to FALSE to indicate that the database string no longer represents the current state of the data item.

Referring to FIG. 5 when data is to be written back to the database through a database-side interface, the database string stored in the source or database string buffer 116 is provided (step 426). If the database string flag CURRENT is TRUE (step 428), the database string is provided directly. If the database string flag is FALSE, the user string is first converted from the user locale to the database or source locale (step 420). The result of the conversion is stored as the database string in the database string buffer 116 (step 422)

and the database string flag is set to TRUE (step 424). In both cases, conversion may be delayed until the data is needed.

In some cases, a completely correct conversion may not be possible, as when a character in the source locale has no corresponding character in the user locale, or vice versa. For that eventuality, a routine may be provided to invoke the conversion of user string to database string (or vice versa), to bring both buffers to a current state (their flag CURRENT is set to TRUE), and to set conversion status flags in flags 190 to indicate whether any errors or exception conditions occurred, and if so, where in the data. (Step 416) These routines and flags may be used at any time to determine whether the conversion results, for example, in character loss.

The problems of data retrieved from, and sent to, different locales is not limited to database applications. For example, the data item may be exchanged by two or more peer processes having two or more locales. Referring back to FIG. 1, data may be read from a second connectivity layer 208 through interface 164. The same user buffer 114 may be used but a different second source buffer 156 holds the data read, and a second source locale 158 holds the locale information. In this way, data may be read from one source, edited by a user, and written to a second source having its own locale. The data item may reside in a distributed object, such as an OLE (Microsoft) or Open Doc (Apple Computer) object. An OLE object normally has a locale simply by virtue of being an OLE object, and the object or a data item in the object may have more locale information associated with it. In addition, the user program or process may also be found in a distributed object with its own locale.

The system and methods described above may be implemented in the framework of the object classes defined in the Microsoft Foundation Class (MFC), as will now be described. The particular implementation to be described is for a client-server database system.

The class LCString is defined. It includes an MFC CString, which serves as the user data buffer described above. One of the data members of an LCString is a pointer to a variable-length structure of class LCSData. An LCSData structure includes the following data members.

(1) m_DBData corresponds to the database string and is used to store the string as received from the database engine in the DBLocale character set. m_DBData represents the characters may be in multi-byte format.

(2) m_ClientString is used to store the user string in the ClientLocale character set.

(3) m_DBLocale is used to store a unique identifier value for a specific locale for accessing locale information for the database. The key value is of type GLocaleKey.

(4) m_fCurrent is used to store a flag indicating what information is current. m_fCurrent corresponds to the user string flag LCStrC or the database string flag LCStrD.

(5) m_DBDataLength is used to store the length of m_DBData in logical characters.

(6) m_AllocLength is used to store the allocated length of m_DBData in bytes.

(7) m_DBByteLength is used to store the length in bytes of m_DBData as actually stored. This value is suitable for copying strings using functions like memcpy.

(8) m_bCumLossToDB and m_bCumLossFromDB are used to store flags indicating whether a conversion loss occurred since the previous occasion in which the flags were cleared. The flags are specific to the direction of the conversion, and are carried across an assignment if the assignment involved an LCString or was the copy constructor.

(9) tcharBuf and tcharBufSize are buffers used during conversion operations, which may grow as required. Functions making use of these buffer must have a critical region identified for use in multi-threaded applications.

(10) m_nRefCount is used to store a counter to the number of references to the LCString. It is incremented for copy and assignment operations on an LCString. Normal decrement occurs in the destructor. If it is decremented to 0, the entry is deleted. If a string is modified by a method, a new m_nRefCount is created for the modified string and the old string's m_nRefCount is decremented.

(11) dbwcharBuf, dbwcharBufSize, mbcharBuf, and mbcharBufSize are buffers used if UNICODE is enabled on the client. Initially, they are not allocated, but are grown as required.

The class GLocale is defined for locale information.

GLocaleMgr is a class for the management of GLocales. Specific locales can be selected by means of a locale string or a GLocaleKey value. In the default case there are two locales, the static user locale ClientLocale and the database locale DBLocale. Multiple simultaneous connections to databases or other sources may result in more than one locale on the source side.

The class LCString has the following constructors.
(1) LCString()
(2) LCString(const CString& stringsrc)
(3) LCString(TCHAR ch, int nRepeat=1)
(4) LCString(LPCSTR lpsz)
(5) LCString(LPCWSTR lpsz)
(6) LCString(LPCTSTR lpch, int nLength)
(7) LCString(const unsigned char * psz)
The foregoing constructors (1–7) correspond to the like-named CString constructors, and use the default database (DB) and Client locale key values.
(8) LCString(const LCString& stringsrc) makes an exact logical copy of the LCString, with the same current flags and locales.
(9) LCString(GLocaleKey locKey, const gl_mchar_t* psz) is for handling data from the server.
(10) LCString(LPCTSTR gl, const gl_mchar_t * psz) is for handling data from the engine if the proper GLocaleKey is not available.
(11) LCString(LCurrency& value, LPCTSTR fmt)
(12) LCString(LNumber& value, LPCTSTR fmt)
(13) LCString(LDateTime& value, LPCTSTR fmt)
(14) LCString(LCurrency& value, const LCString& fmt)
(15) LCString(LNumber& value, const LCString& fmt)
(16) LCString(LDateTime& value, const LCString& fmt)
The foregoing constructors (11–16) create strings in the same locales as the argument, using the formatting information in the DBLocale contained in the argument.

The following attributes and methods are defined for class LCString.
   int GetLength( ) const returns the length of the string in TCHAR units on the client side.
   int DBGetLength( ) const returns the length of the DBLocale string in a logical character count.
   BOOL IsEmpty( ) const returns TRUE if the string is of zero length.
   void Empty( ) makes the string an empty (i.e., zero-length) string.
   TCHAR GetAt(int nindex) const returns the TCHAR at TCHAR offset nindex.

void SetAt(int nindex, TCHAR ch) sets the TCHAR at TCHAR offset nindex to ch.

LCString DBGetAt(int nindex) const returns logical character at logical character offset nindex in the DB compatible string using DBLocale character set characteristics.

void DBSetAt(int nindex, const LCString& ch) sets logical character at logical character offset nIndex to ch. The byte length of the string may change in multi-byte situations.

TCHAR operator[] (int nIndex) const is the same as GetAto.

operator LPCTSTR( ) const is a cast operator that gives access to the CString internal string buffer.

operator const CString*( ) const is a cast operator which gives access to the internal CString; however, this is a read-only access.

The following are overloaded assignments defined for the class LCString.
(1) const LCString& operator=(const LCString& stringsrc)
(2) const LCString& operator=(const CString& stringsrc)
(3) const LCString& operator=(TCHAR ch)
(4) const LCString& operator=(char ch)
(5) const LCString& operator=(LPCSTR lpsz)
(6) const LCString& operator=(LPCWSTR lpsz)
(7) const LCString& operator=(const unsigned char* psz)

The following are overload string concatenation functions defined for the class LCString, which concatenate the second operator to the first operand.
(1) const LCString& operator+=(const CString& string)
(2) const LCString& operator+=(const LCString& string)
(3) const LCString& operator+=(TCHAR ch)
(4) const LCString& operator+=(char ch)
(5) const LCString& operator+=(LPCTSTR lpsz)

The following operations concatenate two strings, forming a new LCString instance.
(1) friend LCString AFXAPI operator+(const LCString& s1, const CString& s2)
(2) friend LCString AFXAPI operator+(const CString& s1, const LCString& s2)
(3) friend LCString AFXAPI operator+(const LCString& s1, const LCString& s2)
(4) friend LCString AFXAPI operator+(const LCString& s1, TCHAR ch)
(5) friend LCString AFXAPI operator+(TCHAR ch, const LCString& s1)
(6) friend LCString AFXAPI operator+(const LCString& s1, char ch)
(7) friend LCString AFXAPI operator+(char ch, const LCString& s1)
(8) friend LCString AFXAPI operator+(const LCString& s1, LPCTSTR lpsz)
(9) friend LCString AFXAPI operator+(LPCTSTR lpsz, const LCString& s1)

The result of the foregoing operations will be either valid on the client side or the database side. The DBLocale will be set according to the following rules:

In the case where the DBLocales of each of the strings have the same character set, two possibilities exist. First, either argument is valid on DBLocale, then the result is valid in the DBLocale and DBLocale is the locale of the first argument. Second, if neither argument is valid on DBLocale (i.e., they are only valid for clientLocale), then the result is valid in ClientLocale, but DBLocale is the locale of the first argument.

In the case where the DBLocales do not have the same charset value, three possibilities exist. First, if both arguments are valid on the DBLocale side, the result is valid on the DBLocale side, and the result DBLocale will be the locale of the first argument. The second argument will be converted first to the ClientLocale character set, and then converted from that to the DBLocale character set.

Second, if only one argument is valid on the DBLocale side, then the result will be valid on the DBLocale side, and the result DBLocale will be the one that had the string that was valid on the DBLocale side (regardless of whether it was the first or second argument).

This second case is a case commonly encountered in building an SQL statement. The SQL syntax will often be received from a ClientLocale source, such as a file, and will still be in the ClientLocale character set. The first insertion will likely be a localized server name, table name, column name, or text. This will often have been received from the database server and will still be valid on the DBLocale. The result will be valid in the locale of the name, and no character loss should occur.

Third, if neither argument is valid on the DBLocale, the result will be valid on the ClientLocale and the DBLocale will be the locale of the first argument.

In the case where one argument is not LCString (usually TCHAR, CString&, or LPCTSTR), the result will be valid in the DB's locale side of the LCString argument and the DBLocale will be taken from the LCString argument.

The following are string comparison functions:

Compare(const LPCTSTR lpsz) const compares the client side version based on code points.

DBCompare(const LCString& s2) const compares the DB side version based on code points.

CompareNoCase(LPCTSTR lpsz) const compares the client side version based on code points after all characters have been converted to lower case according to ClientLocale.

DBCompareNoCase(const LCString& s2) const compares the DB side version based on code points after all characters have been converted to lower case according to DBLocale.

Collate(LPCTSTR lpsz) const compares the client side version based on ClientLocale collation sort. This may sort in a different order from the engine, even if all characters are the same.

DBCollate(const LCString& s2) const compares the DB side version based on DBLocale collation sort, using GLS (Informix GLS library) algorithms. This should be used when consistency with the DB server is required.

The following are simple sub-string extraction functions.

LCString Mid(int nFirst, int ncount) const extracts nCount TCHAR's beginning at TCHAR offset nFirst in the client side version. If nCount is not present, takes the remainder of the string.

LCString DBMid(int nFirst, int nCount) const extracts nCount logical characters beginning at logical character offset nFirst in the DB side version. If nCount is not present, it takes the remainder of the string.

LCString Left(int nCount) const extracts nCount TCHAR's at the beginning of the client side version. In MBCS situations, this does not check for partial characters at the end of the string.

LCString DBLeft(int nCount) const extracts nCount logical characters at the beginning of the DB side version.

LCString Right(int nCount) const extracts the last nCount TCHAR's of the client side version.

LCString DBRight(int nCount) const extracts the last ncount logical characters of the DB side version.

LCString SpanIncluding(LPCTSTR lpsz) const returns a string containing all characters found at the beginning of the client side string that match characters in lpsz. It returns an Empty string if the first character is not in lpsz.

LCString SpanExcluding(LPCTSTR lpsz) const returns a string containing all characters found at the beginning of the client side string that do not match characters in lpsz. It returns an Empty string if the first character matches a character in lpsz.

The following are conversion functions.

void MakeUpper ( ) makes all characters in the client side version upper case.

void DBMakeUpper( ) makes all characters in the DB side version upper case, according to DBLocale.

void MakeLower ( ) makes all characters in the client side version lower case.

void DBMakeLower( ) makes all characters in the DB side version lower case, according to DBLocale.

void MakeReverse( ) reverses the order of logical characters in the client side string.

void DBMakeReverse( ) reverses the order of logical characters in the DB side string.

The following are whitespace trimming functions.

void TrimRight ( ) trims all trailing white-space characters in the client side version.

void DBTrimRight( ) trims all trailing white-space characters in the DB side version according to DBLocale.

void TrimLeft ( ) trims all leading white-space characters in the client side version.

void DBTrimLeft( ) trims all leading white-space characters in the DB side version according to DBLocale.

The following are search functions:

Find(TCHAR ch) const and Find(LPCTSTR lpsz) const find the TCHAR index of the first occurrence of ch or lpsz within the client side version.

DBFind(TCHAR ch) const and

DBFind(LPCTSTR lpsz) const and

DBFind(const LCString& lc) const find the logical character index of the first occurrence of the argument within the DB side version.

ReverseFind(TCHAR ch) const finds the TCHAR index of the last occurrence of ch within the client side version.

DBReverseFind(TCHAR ch) const and

DBReverseFind(const LCString& lc) const find the logical character index of the last occurrence of the argument within the DB side version.

FindOneOf(LPCTSTR lpsz) const finds the first occurrence in the client side version of any of the characters in lpsz.

DBFindOneOf(LPCTSTR lpsz) const and

DBFindOneOf(const LCString& lc) const find the first occurrence in the DB side version of any of the logical characters in the argument.

The following provide access to string implementation buffers as C character arrays:

LPTSTR GetBuffer(int DMinBufLength) gets a pointer to the internal TCHAR buffer for the client side version. It also guarantees that the buffer is of sufficient size to hold nMinBufLength TCHAR's.

void ReleaseBuffer(int nNewLength=-1) is used to adjust internal variables after a GetBuffer call and direct manipulation of the internal TCHAR buffer. If nNewLength is >=0, a TCHAR null terminator is inserted at the TCHAR offset nNewLength.

LPTSTR GetBufferSetLength(int nNewLength) returns a pointer to the client side buffer after it is adjusted to the nNewLength in TCHAR's.

void FreeExtra ( ) frees any excess memory associated with the client side string buffer.

LPSTR DBGetBuffer(int nMinBufLength) gets a pointer to the internal byte buffer for the DB side version. It also guarantees that the buffer is of sufficient size to hold nMinBufLength logical characters.

void DBReleaseBuffer(int nNewLength=-1) is used to adjust internal variables after a DBGetBuffer call and direct manipulation of the internal DB buffer. If nNewLength is greater than or equal to zero, a logical character null terminator is inserted at the logical character offset nNewLength.

LPSTR DBGetBufferSetLength(int nNewLength) returns a pointer to the DB side buffer after it is adjusted to the nNewLength in logical characters.

void DBFreeExtra ( ) frees any excess memory associated with the DB side string buffer.

The following methods are also defined:

~LCString ( ) is the destructor.

int GetAllocLength ( ) const gets the length of the client side buffer in TCHAR's.

DBGetAllocLength ( ) gets the length of the DB side buffer in bytes. This size is in bytes, because the character set on the DB server may not be of the same type (single-byte, multi-byte, wide character) as the client machine.

BOOL CumLossToDB ( ) const and

BOOL CumLossFromDB ( ) const return TRUE if there was a character loss (a character in one character set has no matching character in the other, so a substitute character is put in its place) during a conversion since the last time the internal flag was reset (or from initial creation). These flags are preserved across assignment of LCString (but not concatenation) and through the copy constructor. Character loss does not refer to a change in the number of logical characters, but rather to a loss of meaning, because the original string can no longer be reconstructed.

void ResetCumLossToDB ( ) and void ResetCumLossFromDB ( ) reset the internal status of the flag (to FALSE).

SetDBLocale(GLocaleKey key) adjusts the DBLocale side to key. If the character set of the previous locale is not the same as that of key, and if the string was current only on the server side, the string will first be converted to the client locale before the new locale replaces the old one. The return value is the argument (key).

SetDBLocale(LPCTSTR loc) adjusts the DBLocale side to a locale defined by loc. If the character set of the previous locale is not the same as that of loc, and if the string was current only on the server side, the string will first be converted to the client locale before the new locale replaces the old one. The return value, if successful, is the GLocaleKey value created for loc.

ForceToDB ( ) forces the string to be current on the DB side. This function will not throw exceptions, but rather will trap exceptions, and return an error code if an exception or any other problem is encountered. There will be valid data (maybe only the empty string) even for the failure return.

This function can be used to avoid some exception cases, especially if there would otherwise be simple query methods, like GetLength ( ). The return codes are the following.

(1) LC_FORCESUCCESS: a successful return. The string was converted successfully or it was already current on the DB side, and no data loss flags for conversion (either direction) are currently set.

(2) LC_FORCEMEMORY: a memory error was encountered during the conversion process. The resulting string on the DE side will be a zero length string, and data loss flags will be set for conversion to DE.

(3) LC_FORCEGLSCONVERSIONMISSING: there is no conversion for the two character sets involved, and they are not the same character set. This means that part of GLS is not installed, environment variables may not be set up correctly, or simply no support is currently available for this set of languages. The resulting string on the DE side will be a zero length string, and data loss flags will be set for conversion to DR.

(4) LC_FORCEGLSCONVERSIONERROR: an error (not data loss) occurred during the conversion process. The primary source of this type of error would be: illegal character encountered, The resulting string on the DB side will be a zero length string, and data loss flags will be set for conversion to DB.

(5) LC_FORCEDATALOSSNOW: the string was converted by this function, but some data was lost during the conversion. This return will only be given if the actual conversion was performed and caused data loss.

(6) LC_FORCEDATALOSSPREVIOUS: the string was converted successfully, with no data loss for this conversion, but the cumulative data loss flag is still set. This may mean that some previous operation had data loss on previous operations. This may or may not apply to the current string.

(7) LC_FORCEDATAPREVIOUSLOSS: no conversion was required because the string was already current on the DB side. However, at least one of the four data loss flags was set. The loss may relate to the contents of the current string.

ForceToCliento ( ) forces the string to be current on the client side. This function will not throw exceptions, but rather will trap exceptions, and return an error code if an exception or any other problem is encountered. There will be valid data (maybe only the empty string) even for the failure return. This function can be used to avoid some exception cases, especially if there would otherwise be simple query methods, like GetLength( ). The return codes are the following:

(1) LC_FORCESUCCESS: a successful return value. The string was converted successfully or it was already current on the client side, and no data loss flags for conversion (either direction) are currently set.

(2) LC_FORCEMEMORY: a memory error was encountered during the conversion process. The resulting string on the client side will be a zero length string, and data loss flags will be set for conversion to client.

(3) LC_FORCEGLSCONVERSIONMISSING: there is no conversion for the two character sets involved, and they are not the same character set. This means that part of GLS is not installed, environment variables may not be set up correctly, or simply no support is currently available for this set of languages. The resulting string on the client side will be a zero length string, and data loss flags will be set for conversion to client.

(4) LC_FORCEGLSCONVERSIONERROR: an error (not data loss) occurred during the conversion process. The primary source of this type of error would be illegal character encountered. The resulting string on the client side will be a zero length string, and data loss flags will be set for conversion to client.

(5) LC_FORCEDATALOSSNOW: the string was converted by this function, but some data was lost during the conversion. This return will only be given if the actual conversion was performed and caused data loss.

(6) LC_FORCEDATALOSSPREVIOUS: the string was converted successfully, with no data loss for this conversion, but that the cumulative data loss flag is still set. This may mean that some previous operation had data loss on previous operations. This may or may not apply to the current string.

(7) LC_FORCEDATAPREVIOUSLOSS: no conversion was required because the string was already current on the DB side. However, at least one of the 4 data loss flags was set. The loss may or may not relate to the contents of the current string.

Unlike the foregoing methods,

UpdateC(BOOL NoExceptions=FALSE) and

UpdateDB(BOOL NoExceptions=FALSE) are internal (protected) methods that support the ForceToClient and ForceToDB routines but have a new argument added. If the argument is TRUE, all exceptions (including memory exceptions thrown by new) will be caught and converted to return values. Further, errors detected within this routine will return error values if the argument is TRUE; they will throw exceptions if the argument is FALSE. The actual return values will match the return values for ForceToClient and ForceToDE.

The following method gives an equivalent to an engine function:

DBSafeMid(int offset, int length) const uses byte based offset and length values (as opposed to the logical character basis for most other methods). If either offset or length values result in partial logical characters at the beginning or end of the string, the partial character bytes are replaced by the space character ("). If the string is "A1A2B1B2C1C2" (i.e., 3 multi-byte characters), then DBSafeMid(1,4) will return "B1B2", where the superscripts represent the byte subscripts for multi-byte characters.

The following routines allow the reference counting capability:

LockBuffer( ) matches the signature of CString and returns a pointer to the valid client buffer. This call turns off the reference counting for this instance of the LCString. That means that a separate copy of internal data will be made for this instance (if there are any other instances looking at this data), and if assigned/copied to another LCString instance while locked, a separate copy of the data will be created for the destination instance (as opposed to reference counting when unlocked).

LockBuffero assumes that the user will modify the buffer, and therefore invalidates the DB buffer contents. Further, if any access is made to this instance that requires the DB side currency will fail in an ASSERT.

LockDBBuffer( ) is equivalent to LockBuffer, but returns a pointer to the valid DB-side buffer. This call turns off the reference counting for this instance of the LCString. That means that a separate copy of internal data will be made for this instance (if there are any other instances looking at this data), and if assigned/copied to another LCString instance while locked, a separate copy of the data will be created for the destination instance (as opposed to reference counting when unlocked).

LockDBBuffer( ) assumes that the user will modify the buffer, and therefore invalidates the client buffer contents. Further, if any access is made to this instance that requires the client side currency will fail in an ASSERT.

ReleaseBuffer( ) unlocks the buffers locked by either LockBuffer( ) or LockDBBuffer( ).

PrevCharIndex(int index) const, from a TCHAR offset (index) into the string, will determine the TCHAR index of the previous logical character in the client side string. The successful return value will be greater than or equal to zero and less than GetLength( ). If the index is 0 (pointing at the beginning of the string) or is outside the string, the return value will be −1. This must be used instead of the "--" operator to modify the index.

GetCharValue(int index) const, from a TCHAR offset (index) into the client side string, returns the logical character value at that location. The successful return value will be 0<=return value<=UCHAR_MAX (255 or 65535 for most Microsoft cases). The return value will be 0 if pointing at the end of the string marker (==GetLength( )). If the index is outside the string, the return value will be −1.

Each of the following functions tests the logical character at the TCHAR offset (nIndex). Each function returns TRUE (1) if the logical character has the characteristic. It returns FALSE (0) if the character does not have the characteristic, or is out of the range of index values for the string.
(1) IsAlnum(int nindex) const
(2) IsAlpha(int nindex) const
(3) IsBlank(int nindex) const
(4) IsControl(int nindex) const
(5) IsDigit(int nindex) const
(6) IsGraph(int nIndex) const The following methods support exception handling:
GLocaleMgr::Init(void(*)(int, LPCTSTR, LPCTSTR)= DoExcept) installs the "application-defined" exception handler and then initializes the GLocaleMgr data. This function should be called immediately after a LoadLibrary for the DLL. The argument is the application replacement for the default function below. It allows custom handling of errors.

void DoExcept(int error, LPCTSTR msg, LPCTSTR arg) is the default "user-exception" handler for the LCString DLL. It displays a message box, then throws a CUserException. Any replacement can process the argument in any manner (storing it elsewhere), and throwing any kind of exception (it can have multiple, specialized exceptions that contain error number and message, if desired).

To use LCString, the GLocaleMgr must be set up with default locales before a connection is made to a server. In addition, each additional server's locale should be entered with GLocaleMgr::GLAddReference before connection, and the GLocaleKey should be stored for use in creating LCStrings.

If this is a database that has a locale per column (field), immediately following the connection additional locale information should be gathered and put into the GLocaleMgr, and the resulting GLocaleKeys stored.

If the DBLocale is not known before connection, the following procedure can be used. The default DBLocale can be set to be the same as the client locale (or any desired arbitrary locale which may be one related to another database). The database is opened and queried to determine the locale information, and the DBLocale can be properly set up. All the initial information transferred in doing this is limited to the 7-bit ASCII section that is common to all character sets and in the same basic location.

One way to create a LCString is "new LCString(locKey, buffer)", where "locKey" is a GLocaleKey and "buffer" is a "char *" variable. The buffer must have a zero-terminator on it. If it is a fixed character field, it must have room to have the terminator in it, or it must be moved to a buffer large enough to contain the zero-terminator. This buffer will be character based, as all transfers from a database server will be in multi-byte format.

To write data to the database, DBGetBuffero and DBGetBytes( ) are used to access the characters for copying back to the server. These methods will always have the string in the char* multi-byte format expected for transfer to the server. If padding is done, it is done (e.g., for fixchar) before the buffer methods are called.

To edit a field in a record in a database, an implementation using LCString may proceed as follows. m_DBData is received from the database engine 110 and stored in database string buffer 116. If conversion is required to the user character set, converter 118 would perform the conversion using m_DBData and locale information from GLocale (step 212).

GLocale is available via GLocaleKey m_DBData. m_DBData has a pointer to m_DBLocale. GLocaleKey represents the key value for accessing the GLocale information in the GLocaleMgr. GLocaleMgr has a static member which represents the user locale. The data member tcharbuf may be used during the conversion as a buffer.

The conversion results are placed in user string buffer 114 as m_ClientString. m_DBData remains unchanged.

The user may then alter, modify, or in some other way edit m_ClientString stored in user string buffer 114. If such editing is performed, the resulting string may be placed back into the LCString via an assignment operation. The user flag LCStrC is still set TRUE while the database flag LCStrD is reset to FALSE.

The record may be returned to the database. This is termed the UPDATE operation. This operation usually entails the building, via an appropriate tool, of an UPDATE string. The string is sent to the database engine to modify the database.

In building the UPDATE string, access is made to the user string m_ClientString because it represents the most current information if an edit was performed on the record. A conversion is performed to convert the database string m_DBData so that it is a converted form of the newly edited user string. Whether m_ClientString has been edited may be determined by examining the state of LCStrD. Tests may be performed on m_DBData to ensure that a valid conversion resulted.

Appropriate flags may be set corresponding to whether, for example, character loss occurred. The user may test these flags to determine whether the conversion will be valid. These tests may occur before the database string has been written back to the database.

The results of the conversion are stored in DBData and the database string flag LCStrD is reset to TRUE.

If no edit was made to m_ClientString, no conversion would be necessary. The UPDATE statement would be constructed using m_DBData, the database string.

This embodiment is not limited to editing operations, as described above. For example, if strings from two different locales are compared in dictionary order, the order of comparison may vary according to the country. Thus, the comparison would be undefined or an invalid operation. An initial test, within the user locale, could determine this before a call is mode to on the server.

The invention has been described in terms of an embodiment. The invention, however, is not limited to the embodi-

What is claimed:

1. A computer program, residing on a computer-readable medium, comprising instructions for causing a computer to:

establish in a memory a two-part buffer usable to provide a single data item in two different locales, the two-part buffer comprising a first data buffer for storing data and a second data buffer for storing data, the first data buffer having associated with it a first status flag and the second data buffer having associated with it a second status flag, each status flag being usable to indicate the status of data in the associated data buffer, a locale being a collection of information about country-specific or language-specific conventions for characters, sorting, date/time, currency, or numbers;

set the first status flag to current and the second status flag to non-current in response to storing data having a first locale in the first data buffer, to set the second status flag to current and the first status flag to non-current in response to storing data having a second locale in the second data buffer, to set the first status flag to current in response to converting current data in the second data buffer from the second locale to the first locale and storing the converted current data in the first data buffer, and to set the second status flag to current in response to converting current data in the first data buffer from the first locale to the second locale and storing the converted current data in the second data buffer; and read a data item from the two-part buffer by reading from the first buffer when the first status is current in response to a request to the first buffer and by reading from the second buffer when the second status is current in response to a request to the second buffer.

2. The computer program of claim 1, further comprising instructions to:

establish a first-side interface to read data from or write data to the two-part buffer;

establish a second-side interface to read data from or write data to the two-part buffer;

read a data item by reading from the first data buffer in response to a request from the first-side interface, if the first status is current and by reading from the second buffer in response to a request from the second-side interface, if the second status is current;

cause data in the second data buffer to be converted from the second locale to the first locale and to be stored in the first data buffer in response to the request from the first-side interface, if the first status is non-current; and cause the data in the first data buffer to be converted from the first locale to the second locale and to be stored in the second data buffer in response to the request from the second-side interface, if the second status is non-current.

3. A computer-implemented method for making a data item available for reading and writing in two different locales, comprising:

providing both a user interface and a source interface to read or write the data item, the user interface functioning in a user locale, a locale being a collection of information about country-specific or language-specific conventions for characters, sorting, date/time, currency, or numbers, and the source interface functioning in a source locale, the source locale being different from the user locale;

providing a user buffer in a memory and a source buffer in a memory, each buffer operable to store the data item, the user buffer being operable to store the data item according to the user locale and the source buffer being operable to store the data item according to the source locale, the user buffer having a user buffer status and the source buffer having a source buffer status;

setting the source buffer status to non-current and the user buffer status to current when new data is stored in the user buffer through the user interface according to the user locale, and setting the user buffer status to non-current and the source buffer status to current when new data is stored in the source buffer through the source interface according to the source locale;

satisfying a request from the user interface to read the data item by reading from the user buffer if the user buffer status is current and otherwise by converting data in the source buffer from the source locale to the user locale and storing the converted data in the user buffer before reading the user buffer; and satisfying a request from the source interface to read the data item by reading from the source buffer if the source buffer status is current and otherwise by converting data in the user buffer from the user locale to the source locale and storing the converted data in the source buffer before reading the source buffer.

4. The method of claim 3 further comprising:

providing at least one conversion status flag;

determining if one of the steps of converting data in the source buffer and converting data in the user buffer is successful or non-successful; and setting the at least one conversion flag to current if the determination is successful, and otherwise setting the at least one conversion flag to non-current.

5. The method of claim 4 wherein the determining step further comprises determining a loss in the data by comparing a first amount of data characters in one of the source buffer and user buffer to a second amount of data characters in one of the source buffer and the user buffer and determining if the first and second amounts are substantially similar.

6. The method of claim 3 where the source interface is coupled to a server and user interface is coupled to a client to the server.

7. The method of claim 6 where the server is a database server managing and a database engine handling requests for access to the database.

8. The method of claim 7 where the database is a relational database managed by a relational database management system including the database engine.

9. The method of claim 7 where the data item is the name of a field of a record of the database.

10. The method of claim 7 where the source locale is a locale defined for a field of the database.

11. The method of claim 7 where the source locale is a locale defined for the database.

12. The method of claim 6 where the source locale is a locale defined for the server.

13. The method of claim 3 where the data item is in one of a collection of distributed objects.

14. The method of claim 13 where the one of the distributed objects is an Object Linking and Embedding (OLE) object.

15. The method of claim 3 further comprising:

providing a second interface for a second program to gain access to the data item for reading or writing;

providing a second locale;

providing a second buffer to store the data item;

maintaining status memory to store the status of the second buffer contents;

setting the status of the second buffer to be non-current when new data is stored in the user buffer through the user interface or in the source buffer through the source interface;

setting the status of the user buffer to be non-current and the source buffer to be non-current and the second buffer to be current when new data is stored in the second buffer through the second interface; and satisfying a request from the second interface to read the data item by reading the contents of the second buffer if the status of the source buffer is current and converting the contents of the either the user buffer from the user locale or the source buffer from the source locale to the second locale and storing the converted contents in the second buffer before the second buffer is read if the status of the second buffer is non-current.

16. A data process system, comprising:

a data item stored in a first memory in accordance with a first locale, a locale being a collection of information about country-specific or language-specific conventions for characters, sorting, date/time, currency or numbers;

a first computational process coupled to the first memory and operable to use the data item in accordance with a first locale;

a second computational process in data communication with the first memory and operable to use the data item in accordance with a second locale different from the first locale; and means for making the data item available to the first computation process in accordance with the first locale, for making the data item available to the second computation process in accordance with the second locale, for converting the data item to be in accordance with the first locale after it has been operated on by the second computational process, and for converting the data item to be in accordance with the second locale after it has been operated on by the first computational process.

17. The system of claim 16, further comprising:

a first buffer and a second buffer;

means for handling the data item as stored in the first buffer and the second buffer, the data item as stored in the first buffer being in the first locale and the data item as stored in the second buffer being in the second locale; and means for maintaining currency status for the data item for each of the first buffer and the second buffer, the currency status indicating whether the data item as stored in the corresponding buffer is or is not current.

18. The system of claim 17, wherein:

the data item comprises characters, the first buffer comprises a first string buffer, the second buffer comprises a second string buffer, the first locale comprises a first character set and the second locale comprises a second character set;

the means for making the data item available comprises means for converting characters from the first character set to the second character set and for converting characters from the second character set to the first character set; and the means for maintaining currency status further indicating whether data loss has occurred in a conversion of characters between the first buffer and the second buffer.

19. The system of claim 18 further comprising:

a third computational process in data communication with the first memory and operable to use the data item in accordance with a third locale different from the first locale and the second locale;

means for making the data item available to the third computation process in accordance with the third locale;

means for converting the data item to be in accordance with the third locale after it has been operated on by one of the first and second computational processes; and means for converting the data item to be in accordance with one of the first and second locales after it has been operated on by the third computational process.

20. The system of claim 19 further comprising:

means for handling the data item as stored in a third buffer in the third locale;

means for maintaining currency status for the data item for the third buffer;

wherein, the third buffer comprises a third string buffer and the third locale comprises a third character set;

the means for making the data item available to the third computational process comprises means for converting characters from the first and second character sets to the third character set and converting the third character set to one of the first and second character sets; and the means for maintaining a currency status for the data item for the third buffer comprises means for indicating whether data loss has occurred in a conversion of characters between the third buffer and one of the first and second buffers.

21. A computer-implemented method for maintaining a data item for use by computational processes operating in two different locales, a locale being a collection of information about country-specific or language-specific conventions for characters, sorting, date/time, currency or numbers, comprising:

storing the data item in a first memory in accordance with a first locale;

providing a first computational process coupled to the first memory, the first computational process operable to use the data item according to a first locale;

providing a second computational process operable to use the data item according to a second locale, the second locale being different from the first locale;

making the data item available to one of the first computational process according to the first locale and the second computational process according to the second locale;

converting the data item according to the first locale after the data item has been altered by the second computational process; and converting the data item according to the second locale after the data item has been altered by the first computational process.

22. The method of claim 21 further comprising:

providing a first buffer and a second buffer;

storing the data item in the first buffer according to the first locale;

storing the data item in the second buffer according to the second locale; and maintaining a currency status for the data item in the first buffer and for the data item in the second buffer.

23. The method of claim 22 wherein the data item comprises a plurality of characters, the first locale comprises a first character set, the second locale comprises a second character set, and further comprising:

converting the plurality of characters from the first character set to the second character set;

converting the plurality of characters from the second character set to the first character set; and indicating whether any of the plurality of characters was lost during the conversion steps between the first buffer and the second buffer.

24. The method of claim 23 further comprising:

providing a third computational process operable to use the data item according to a third locale different from the first locale and the second locale;

making the data item available to the third computation process according to the third locale;

converting the data item according to the third locale after it has been operated on by one of the first and second computational processes; and converting the data item according to one of the first and second locales after it has been operated on by the third computational process.

25. The method of claim 24 further comprising:

providing a third buffer;

storing the data item in the third buffer according to the third locale;

handling the data item as stored in a third buffer in the third locale, wherein the third locale includes a third character set;

maintaining a currency status for the data item for the third buffer;

converting the plurality of characters from the first and second character sets to the third character set;

converting the plurality of characters from the third character set to one of the first and second character sets; and indicating whether any of the plurality of characters was lost during the converting steps between the third buffer and one of the first and second buffers.

* * * * *

UNITED STATES PATENT AND TRADEMARK OFFICE
CERTIFICATE OF CORRECTION

PATENT NO. : 5,812,964

DATED : September 22, 1998

INVENTOR(S) : Finger

It is certified that error appears in the above-identified patent and that said Letters Patent is hereby corrected as shown below:

Claims:

Claim 7, column 16, line 47, insert --a database-- before "and".

Signed and Sealed this

Twenty-fourth Day of August, 1999

Attest:

Attesting Officer

Q. TODD DICKINSON

Acting Commissioner of Patents and Trademarks

UNITED STATES PATENT AND TRADEMARK OFFICE
CERTIFICATE OF CORRECTION

PATENT NO. : 5,812,964
DATED      : September 22, 1998
INVENTOR(S): Finger

Page 1 of 2

It is certified that error appears in the above-indentified patent and that said Letters Patent is hereby corrected as shown below:

In DETAILED DESCRIPTION,
Column 6, line 29, change "stringsrc" to --stringSrc--,
          line 38, change "stringsrc" to --stringSrc--,
Column 6, line 66, change "nindex" to --nIndex--,
          line 67, change "nindex" to --nIndex--.
Column 7, line 1, change "nindex" to --nIndex--,
          line 2, change "nindex" to --nIndex--,
          line 3, change "nindex" to --nIndex--,
          line 4, change "nindex" to --nIndex--,
          line 7, change "nindex" to --nIndex--,
          line 12, change "GetAto" to --GetAt( )--,
          line 22, change "stringsrc" to --stringSrc--,
          line 23, change "stringsrc" to --stringSrc--.
Column 8, line 52, change "ncount" to --nCount--.
Column 9, line 62, change "DMinBufLength" to --nMinBufLength--.
Column 10, line 13, change "nNewLength=-1" to --nNewLength = -1--.
Column 11, line 11, change "DE" to --DB--,
           line 12, change "DE" to --DB--,
           line 17, change "DE" to --DB--,
           line 19, change "DR" to -- DB--.
           line 41, change "ForceToCliento" to --ForceToClient--.

UNITED STATES PATENT AND TRADEMARK OFFICE
CERTIFICATE OF CORRECTION

PATENT NO. : 5,812,964
DATED : September 22, 1998
INVENTOR(S) : Finger

It is certified that error appears in the above-indentified patent and that said Letters Patent is hereby corrected as shown below:

```
Column 12, line 30, change "DE" to --DB--,
           line 38, change "(")" to --(' '),
           line 55, change "LockBuffero" to --LockBuffer--.
Column 13, line 20, change "(=GetLength())" to --(== GetLength()),
           line 27, change "nindex" to --nIndex--,
           line 28, change "nindex" to --nIndex--,
           line 29, change "nindex" to --nIndex--,
           line 30, change "nindex" to --nIndex--,
           line 31, change "nindex" to --nIndex--,
           line 32, change "nndex" to --nIndex--,
Column 14 line 9, change "DBGetBuffero" to --DBGetBuffer--.
```

Signed and Sealed this

Twelfth Day of October, 1999

Attest:

Q. TODD DICKINSON

*Attesting Officer*    *Acting Commissioner of Patents and Trademarks*